United States Patent Office 3,147,301
Patented Sept. 1, 1964

3,147,301
SULFO-ORGANIC ESTERS OF FUMARIC AND MALEIC ACIDS
David P. Sheetz, Midland, Mich., assignor to The Dow Chemical Company, Midland, Mich., a corporation of Delaware
No Drawing. Filed Nov. 22, 1960, Ser. No. 70,913
7 Claims. (Cl. 260—485)

The present invention relates to novel mono- and di-(sulfo-organic) esters of ethylenically unsaturated vicinal dicarboxylic acids and methods for their preparation. The invention also relates to a method for imparting ionic properties to copolymers.

It often becomes necessary, or at least desirable, to modify polymers consisting essentially of hydrophobic olefinic monomers in a manner so as to impart thereto a slightly ionic or hydrophilic character. Such a modification is desirable, for example, to improve the dyeability and antistatic properties of the polymer.

A principal object of the present invention is to provide novel hydrophilic, ionic monomers. Particularly, it is an object of the invention to provide mono- and di-(sulfo-organic) esters of ethylenically unsaturated vicinal dicarboxylic acids. Still further objects are to provide methods for preparing such monomeric materials and methods for utilizing the same to modify the ionic character of copolymers of the same. Other objects and benefits will become manifest hereinafter as the invention is more fully described.

Accordingly, it has been discovered that the objects of the present invention are fulfilled in a monomeric compound selected from the group consisting of the free acid and salt forms of mono- and di(sulfo-organic) esters of ethylenically unsaturated vicinal dicarboxylic acids selected from the group consisting of maleic, fumaric and itaconic acids, said sulfo-organic groups containing from 2 to 16 carbon atoms, inclusive. The term "vicinal" refers to the location of the carboxyl groups or carboxyl-forming groups as in the instance of anhydrides, on adjacent carbon atoms of the same molecule.

To prepare the sulfo-organic esters of the invention, the above dicarboxylic acids, their anhydrides where applicable, or the corresponding acyl halide wherein the halogen, for example, is chlorine or bromine, are reacted with a suitable hydroxysulfonic acid or appropriate salt thereof corresponding to the general formula $$HO-Q-SO_3M$$

wherein Q is a divalent hydrocarbon radical selected from the group consisting of saturated aliphatic hydrocarbons and aromatic hydrocarbons of the benzene series having its valence bonds on different carbon atoms and M is a hydrogen, alkali metal, alkaline earth metal, ammonia or amine derived cation. By benzene series is meant the monocyclic aromatic hydrocarbons.

Representative examples of such hydroxysulfonic compounds are

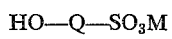hydroxyethanesulfonic acid (isethionic acid),
2-hydroxy-1-propanesulfonic acid,
1-hydroxy-2-propanesulfonic acid,
3-hydroxy-1-propanesulfonic acid,
2-hydroxy-1-butanesulfonic acid,
1-hydroxy-2-butanesulfonic acid,
3-hydroxy-2-butanesulfonic acid,
1-hydroxy-2-methyl-2-propanesulfonic acid,
2-hydroxy-2-methyl-1-propanesulfonic acid,
3-bromo-1-hydroxy-2-propanesulfonic acid,
3-bromo-2-hydroxy-1-propanesulfonic acid,
3-chloro-1-hydroxy-2-propanesulfonic acid,
3-chloro-2-hydroxy-1-propanesulfonic acid,
1-bromo-2-hydroxy-3-butanesulfonic acid,
1-bromo-3-hydroxy-2-butanesulfonic acid,
1-chloro-2-hydroxy-3-butanesulfonic acid,
1-chloro-3-hydroxy-2-butanesulfonic acid,
3-bromo-1-hydroxy-2-butanesulfonic acid,
3-bromo-2-hydroxy-1-butanesulfonic acid,
3-chloro-1-hydroxy-2-butanesulfonic acid,
3-chloro-2-hydroxy-1-butanesulfonic acid,
3-chloro-2-hydroxy-2-methyl-1-propanesulfonic acid,
1-chloro-3-hydroxy-2-methyl-2-propanesulfonic acid,
3-chloro-2-(chloromethyl)-2-hydroxy-1-propanesulfonic acid,
1-chloro-2-(chloromethyl)-3-hydroxy-2-propanesulfonic acid,
1-hydroxy-3-methoxy-2-propanesulfonic acid,
2-hydroxy-3-methoxy-1-propanesulfonic acid,
1-hydroxy-2-octanesulfonic acid,
1-hydroxy-2-dodecanesulfonic acid,
1-hydroxy-2-hexadecanesulfonic acid,
2-hydroxycyclohexanesulfonic acid,
2-hydroxy-2-phenylethanesulfonic acid,
ar-(2-hydroxyethoxy)benzenesulfonic acid ar-phenolsulfonic acid and the like organic hydroxysulfonic acids including salts thereof such as the alkali metal, alkaline earth metal, ammonium and amine salts.

The reaction is carried out by heating a mixture containing suitable proportions of the ethylenically unsaturated, vicinal dicarboxylic acid, its anhydride or acyl halide and the particular hydroxysulfonic acid to be employed at a temperature within the range from about 50° to about 200° C., preferably from about 60° to about 120° C. Suitable proportions of the reactant depend upon the desired product. Reactant mole ratios of approximately 1:1 and 2:1 are usually employed to prepare the half ester and diester products, respectively. It may be desirable, in some instances, however, to employ a large excess of the vicinal dicarboxylic compound when preparing the half ester or a large excess of the hydroxysulfonic compound when preparing the diesters in order to reduce the viscosity of the ultimate reaction product. The excess reactant is, in effect, a solvent medium for the reaction. Upon completion of the reaction, the unreacted material is removed from the product by solvent extraction techniques.

Optionally, a polymerization inhibitor can be incorporated into the reaction mixture in order to minimize or to prevent polymerization of the unsaturated acids or the ester products. Suitable inhibitors are the phenolic inhibitors such as hydroquinone or para-methoxyphenol.

While a mutual solvent for the reactants can be employed, it is usually not necessary to do so. Simply heating the starting materials together in a mass reaction causes an effective proportion thereof to be converted to the desired corresponding sulfoester, even without removing the water of reaction from the reaction mixture. More complete reactions can be achieved, however, when such means as, for example, azeotropic distillation with another solvent, are employed to remove the water of reaction during the course of carrying out the reaction. Suitable azeotroping solvents include, for example, benzene, chlorobenzene, cyclohexane, methylcyclohexane, carbon tetrachloride ethylene dichloride, propylene dichloride and the like.

When the acyl halide or anhydride forms of the dicarboxylic acids are employed as starting materials, or when the water of reaction is removed during the course of the esterification reaction with a free acid, the reaction products obtained are often of such purity as to be useful without further separation. If desired, however, the mono- and di(sulfo-organic) esters of the ethylenically unsaturated vicinal dicarboxylic acids of the invention can be separated from the reaction products by conventional procedures. One such procedure involves fractional recrystallization from a suitable solvent. In this manner, products of a very high purity and consistency are obtained. Another separatory procedure applicable to the crude product mixture because of its ionic character is electrodialysis.

Salts of the sulfo-organic esters of the invention which include the carboxyl-sulfonate (acid-salt) and carboxylate-sulfonate (mixed salts) in the case of the mono-esters as well as the disulfonates in the case of the diesters, are prepared by reacting a suitable quantity of a basic material with the free acid form of the product. Basic materials that may be employed for this purpose include the alkali metal hydroxides, carbonates or bicarbonates, alkaline earth hydroxides or carbonates, ammonium hydroxide and amines having up to 12 carbon atoms. At least 1 mole and up to about 2 moles of the basic material are employed for each mole of the free acid form of the ester to be neutralized.

In connection with the present invention, it has been further discovered that the mono- and di(sulfo-organic) esters of ethylenically unsaturated vicinal dicarboxylic acids having 4 carbon atoms, specifically maleic and fumaric acids, constitute, by virtue of their polymerization characteristics, a unique class of materials. These hydrophilic, unsaturated esters are capable of being copolymerized with ethylenically unsaturated, hydrophobic monomers to the substantial exclusion of homopolymers of the esters in multiphase polymerization systems in which one phase is an aqueous phase. The monomeric esters of the invention are contained in the aqueous phase while the water-immiscible, hydrophobic monomers copolymerizable therewith constitute one or more other phases in the reaction system. Since the above-specified monomeric esters of the invention do not normally homopolymerize, it is possible, by incorporating a suitable water-soluble, chemical catalyst for the copolymerization reaction into the aqueous phase, to prepare a latex in the aqueous phase of copolymers of the hydrophilic monomers of the invention and hydrophobic monomers contained in the water-immiscible phases. Thus, the ionic monomeric esters of the invention are uniquely capable of being copolymerized with hydrophobic monomers by means of a process which does not require emulsifying agents and which obviates the difficulty of finding a common solvent for both types of monomers. The difficulty of obtaining suitable common solvents is illustrated, and is the problem addressed by Wilkinson in United States Letters Patent 2,900,370, August 18, 1959.

The following examples are illustrative of the present invention and are not to be construed as limiting its scope. In the examples, parts and percentages are by weight unless otherwise specified.

*Example 1.—Preparation of Bis(3-Sulfopropyl) Maleate*

Sodium 3-hydroxypropanesulfonate was prepared in accordance with the method taught by Helberger, Ann. 588, 71 (1954). The corresponding free acid was prepared by dissolving 790 grams of the sodium 3-hydroxypropanesulfonate in 5 liters of water and passing the resulting solution through a cation exchanging resin in the hydrogen (acid) form. The effluent from the ion exchanging bed was concentrated under vacuum to provide 721 grams of a brown, viscous liquid crystallizing at room temperature. The product assayed 65.0 percent free acid.

Next, 196 grams of maleic anhydride and 861 grams of the above-prepared 3-hydroxypropanesulfonic acid were charged to a conventional esterification apparatus comprising a 3 liter, three-necked flask equipped with a stirrer and a condenser attached to a water trap. The reaction mixture was heated on a steam bath until the maleic anhydride had melted. Methylcyclohexane (1000 milliliters) was then added to the flask and the resulting mixture was maintained at its reflux temperature for 19 hours with stirring. At the end of this period, 178 milliliters of the theoretical 265 milliliters of water (including both the water content of the reactants and the water of reaction) had been collected in the trap. The reaction mixture was cooled and the solvent decanted leaving 875 grams of a dark, syrup-like product which was analyzed and found to contain 64.5 percent of an ester mixture consisting of bis(3-sulfopropyl) maleate and bis(3-sulopropyl) fumarate.

Analysis of the reaction product was carried out by first titrating a sample thereof electrometrically with a standard base. The amounts of carboxylic acid and sulfonic acid present in the mixture were determined from the pH curve thus obtained. A known excess of base was then added to the sample and the mixture was heated for one hour at about 100° C. The remaining excess base was titrated. The difference between the amount of base remaining after saponification of the ester and the amount initially added indicated the amount of ester present.

In order to determine the amount of isomerization of the cis(maleate) form of the ester to the trans(fumarate) form, another sample of the above product was hydrolyzed by heating it with potassium hydroxide for 1 hour. Subsequently, hydrochloric acid was added and the hot solution filtered. The filtrate was cooled to 0° C. and upon stirring, crystals of fumaric acid precipitated. In this manner, it was determined that about 15 percent of the above product consisted of the bis(3-sulfopropyl) fumarate.

*Example 2.—Preparation of Bis(3-Sulfopropyl) Fumarate*

In a manner similar to that of the foregoing, 88 grams of fumaric acid and 210 grams of 3-hydroxypropanesulfonic acid were charged along with 500 milliliters of methylcyclohexane to an identical reaction apparatus. The reaction mixture was maintained at its reflux temperature for approximately 18 hours. The solvent reaction medium was then decanted leaving 327 grams of a tarry black mixture which was analyzed according to the procedure of Example 1 and found to contain about 57 percent by weight of bis(3-sulfopropyl) fumarate.

*Example 3.—Preparation of Bis(1-Methyl-2-Sulfoethyl) Maleate*

The procedure and apparatus employed in the following example was similar to that of Example 1. To the reaction vessel was charged 196 grams of maleic anhydride and 560 grams of 2-hydroxypropanesulfonic acid along with 1000 milliliters of methylcyclohexane. The resulting mixture was heated with stirring for 19 hours. Most of the methylcyclohexane solvent was decanted and the remainder was removed by evaporation. The product recovered was a brown, stringy syrup which solidified upon standing at room temperature. The total amount of the product obtained was 1007 grams and upon analysis it was found to contain about 48 percent by weight of an ester product.

By saponifying and subsequently acidifying a portion of the above product in a manner similar to that employed in Example 1, it was determined from the quantity of fumaric acid recovered that about 17 percent of the above ester product had isomerized to bis(1-methyl-2-sulfoethyl) fumarate. The remainder of the product was bis(1-methyl-2-sulfoethyl) maleate.

*Example 4.—Preparation of Bis(1-Methyl-2-Sulfoethyl) Itaconate*

In an apparatus similar to that of Example 1, a mixture of 130 grams of itaconic acid and 626 grams of 2-hydroxypropanesulfonic acid were reacted in the presence of 500 milliliters of methylcyclohexane and 0.5 gram of p-methoxyphenol. The pressure within the reaction vessel was reduced to about 250 millimeters of mercury and the reaction mixture was refluxed at 65° C. for 4.5 hours. After removal of the methylcyclohexane from the resulting product by distillation under a vacuum, a sample of the product was analyzed whereby it was found that 75 percent of the available carboxyl groups were esterified.

Additional methylcyclohexane was added to the remaining product and the mixture was refluxed under the same conditions for another 26 hours. The solvent was removed from the reaction product by distillation under a vacuum. Upon analysis, it was found that about 87 percent of the available carboxyl groups were esterified. As a cross-check, it was also determined that about 17 percent of the carboxyl functionality existed in the form of free acid groups. About 99 percent of the sulfonic acid groups initially charged were accounted for.

*Example 5.—Preparation of Bis(2-Sulfoethyl) Maleate and Fumarate*

In a manner similar to that of Example 1, toluene and stoichiometric quantities of maleic anhydride and 2-sulfoethanol (isethionic acid) were refluxed together with vigorous stirring for 17 hours. The reaction mixture was allowed to cool and toluene was decanted leaving a dark, syrupy product. Upon analysis of the product, it was found that 75 percent of the available carboxyl groups were esterified.

Subsequent saponification of the crude ester product followed by precipitation of the resutling fumaric acid by cooling the solution to 0° C. indicated that the ester product consisted of about 48 percent bis(2-sulfoethyl) fumarate.

To isolate the fumarate isomer, 50 grams of the above-prepared crude ester product were dissolved in 25 milliliters of water and ammonia was bubbled into the solution with vigorous stirring and cooling at about 15° C. The pH of the solution was raised to 8.0 at which point 400 milliliters of a 50-50 acetone-methanol solution was added to the reaction mixture. The resulting crystalline precipitate was recovered by filtration and washed with methanol to yield 18 grams of ammonium bis(2-sulfoethyl) fumarate, a portion of which, having been recrystallized twice from an aqueous ethanol solution, analyzed 26.5 percent carbon, 4.9 percent hydrogen, 7.3 percent nitrogen and 17.8 percent sulfur. For purposes of comparison, theoretical percentages of these components are 26.2 percent carbon, 4.9 percent hydrogen, 7.7 percent nitrogen and 17.5 percent sulfur. The pure bis(2-sulfoethyl) fumarate ammonium salt decomposed at 283° C.

The fumarate esters and salts thereof are also directly prepared in nearly quantitative yields in accordance with the foregoing procedure by employing fumaric acid in place of the maleic anhydride starting material.

*Example 6.—Preparation of Bis(2-Sulfoethyl) Itaconate*

To an apparatus similar to that employed in Example 1 were charged 510 grams of 2-sulfoethanol, 260 grams of itaconic acid, 400 milliliters of toluene and 1 gram of p-methoxyphenol. The pressure above the reaction mixture was reduced to and maintained during the course of the reaction at a point within the range from about 180 to 240 millimeters of mercury. A slow stream of air was permitted to bubble through the reaction mixture as it was stirred and heated at its reflux temperature for 23 hours. The toluene was removed from the reaction mixture by vacuum distillation under 20 millimeters of mercury pressure to provide 717 grams of a dark red syrup. A sample of this product was analyzed and it was determined that 91 percent of the available carboxyls were esterified with the remaining carboxyl functionality existing in the form of free acid groups. Also ascertained was the presence of about 92 percent of the sulfonic groups and about 92 percent of the theoretical ethylenic unsaturation based on the original concentration of these groups in the reaction mixture.

*Example 7.—Preparation of Sodium 2-Sulfoethyl Hydrogen Maleate*

In an apparatus similar to that employed in Example 1, 296 grams of sodium isethionate was gradually added to 392 grams of molten maleic anhydride at 85° C. After about 2 hours, the reaction mixture became very viscous. The temperature of the reaction mixture was then increased to about 160° C. whereupon the mixture was poured with constant stirring into toluene thereby precipitating a solid product. This product was separated from the toluene by filtration and then ground up in the presence of acetone. The solids were again separated by filtration and dried under vacuum at 70° C. A portion of the product was analyzed and found to contain 70 percent of sodium 2-sulfoethyl hydrogen maleate with the remainder of the mixture consisting of about 5 percent maleic acid and 20 percent sodium isethionate.

Bis(sodium-2-sulfoethyl) maleate is prepared in accordance with the foregoing procedure by employing at least about 2 moles of sodium isethionate for each mole of maleic anhydride employed.

*Example 8.—Preparation of Sodium 3-Sulfopropyl Hydrogen Maleate*

In a manner similar to that employed in Example 7, 81 grams of sodium 3-hydroxypropanesulfonate were reacted with 98 grams of maleic anhydride at 110° C. During the course of the reaction, i.e., after from about 1 to 2 hours, the reaction mixture became increasingly viscous. The temperature of the reaction mixture was then increased to approximately 160° C. whereupon the mixture was poured into toluene with constant stirring thereby precipitating a brittle brown mass. The solids recovered by filtration were ground in the presence of acetone and allowed to stand therein for about 24 hours. The solids were again recovered by filtration, washed with acetone and dried under a vacuum at about 70° C. The product obtained weighed 97 grams and analyzed 89 percent sodium 3-sulfopropyl hydrogen maleate. The reaction thus yielded 67 percent of the desired ester based on the charged quantity of isethionate.

*Example 9.—Preparation of Sodium 3-Sulfopropyl Hydrogen Itaconate*

In a manner similar to that employed in Example 7, 81 grams of sodium 3-hydroxypropanesulfonate were reacted with molten itaconate anhydride at 110° C. During the course of the reaction, the reaction mixture became very viscous. After about 2 hours, the temperature of the reaction mixture was increased to about 135° C. whereupon the mixture was poured into toluene with constant stirring thereby precipitating a brittle, green-gray mass. The solids recovered by filtration were ground and allowed to stand in acetone for about 16 hours. The solids were again recovered by filtration and dried. A portion of the product was analyzed and found to contain 67 percent sodium 3-sulfopropyl hydrogen itaconate with the total yield being 50 percent based on the charged quantity of isethionate.

In a manner similar to that of the foregoing examples, other hydroxysulfonic acids such as 2-hydroxy-1-butanesulfonic acid, 1-chloro-2-hydroxy-3-butanesulfonic acid, 1-hydroxy-2-methyl-2-propanesulfonic acid, 3-chloro-2-hydroxy-1-propanesulfonic acid, 2-hydroxycyclohexanesulfonic acid, 2-hydroxy-2-phenylethanesulfonic acid, 1-hydroxy-2-octanesulfonic acid, 1-hydroxy-2-dodecanesulfonic acid, 1-hydroxy-2-hexadecanesulfonic acid, ar-phenolsulfonic acid and ar-(2-hydroxyethoxy)benzenesulfonic acid are substituted for the hydroxysulfonic acids employed in the foregoign examples to achieve comparable results.

*Example 10.—Copolymerization of Acrylonitrile With Ionic Monomers of the Invention*

To a reaction vessel was charged 10 grams of the free acid form of bis(sulfoethyl) itaconate, 100 milliliters of water, sufficient sodium hydroxide to increase the pH to about 4.5, 2.5 grams of a surface active agent, about 0.2 gram of sodium persulfate and 25 grams of acrylonitrile. The reaction vessel was then sealed and tumbled for 8 hours in a water bath maintained at 70° C. The resulting polymer was recovered by filtration, triturated with water and subsequently dried under a vacuum at about 65° C. for 16 hours. The polymer product was analyzed for its sulfur content. The results of this run and others carried out in an identical manner are reported in and compared with theoretical amounts of sulfur assuming complete polymerization in the following Table 1.

TABLE 1

| Ionic Monomers | Grams Ionic Monomers/ Grams Acrylonitrile | Percent Ionic Monomers | Percent Sulfur | | Percent of Theoretical Sulfur [2] |
|---|---|---|---|---|---|
| | | | Theory [1] | Found | |
| Disulfoethyl itaconate | 10/25 | 29 | 4.8 | 2.02 | 42 |
| | 15/25 | 37 | 6.0 | 3.52 | 55 |
| | 6.2/25 | 20 | 1.7 | 0.37 | 21 |
| | 16.6/25 | 40 | 3.4 | 1.23 | 36 |
| | 37.5/25 | 60 | 5.1 | 1.42 | 28 |
| Disulfoethyl fumarate | 6.2/25 | 20 | 1.7 | 0.02 | 1 |
| | 16.6/25 | 40 | 3.4 | 0.56 | 16 |
| | 37.5/25 | 60 | 5.1 | 0.70 | 14 |

[1] Assuming complete copolymerization of the charged monomers.
[2] Indicates actual percentage of charged ionic monomers copolymerized.

What is claimed is:
1. 3-sulfopropyl hydrogen maleate.
2. 3-sulfopropyl hydrogen fumarate.
3. Bis(2-sulfoethyl) maleate.
4. Bis(3-sulfopropyl) maleate.
5. Bis(2-sulfoethyl) fumarate.
6. Bis(3-sulfopropyl) fumarate.
7. An ester selected from the group consisting of mono- and di(sulfo-organic) maleates and mono- and di(sulfo-organic) fumarates wherein the sulfo-organic moiety is provided by a hydroxysulfonic acid, esterification being at the hydroxyl group, having the general formula:

$$HO-Q-SO_3M$$

wherein Q is a divalent hydrocarbon radical selected from the group consisting of saturated aliphatic hydrocarbons and aromatic hydrocarbons of the benzene series having from 2 to 16 carbons and its valence bonds on different carbon atoms and M is selected from the group consisting of hydrogen, alkali metal, alkaline earth metal, and ammonium cations.

References Cited in the file of this patent
UNITED STATES PATENTS

| 2,571,286 | Otto et al. | Oct. 16, 1951 |
| 2,923,724 | Anderson et al. | Feb. 2, 1960 |
| 2,923,734 | Sheetz | Feb. 2, 1960 |

FOREIGN PATENTS

| 662,656 | Great Britain | Dec. 12, 1951 |

OTHER REFERENCES

Wagner et al.: "Synthetic Org. Chem.," pub. by John Wiley & Sons, Inc., (N.Y.) 1953 pp. 480–482.